US005201061A

United States Patent [19]

Goldberg et al.

[11] Patent Number: 5,201,061

[45] Date of Patent: Apr. 6, 1993

[54] METHOD AND APPARATUS FOR SYNCHRONIZING SIMULCAST SYSTEMS

[75] Inventors: Steven J. Goldberg, Coral Springs; Venkat Narayanan, Boca Raton, both of Fla.

[73] Assignee: Motorola, Inc., Schaumburg, Ill.

[21] Appl. No.: 556,158

[22] Filed: Jul. 23, 1990

[51] Int. Cl.[5] .......... H04B 7/00

[52] U.S. Cl. .......... 455/51.2; 455/38.1; 455/57.1; 455/67.1; 340/825.44

[58] Field of Search .......... 455/51, 57, 38, 67, 455/16, 51, 51.1, 51.2, 38.1, 57.1, 67.1; 340/825.44

[56] References Cited

U.S. PATENT DOCUMENTS 4,612,594 9/1986 Yamaura et al. .......... 455/51
4,696,051 9/1987 Breeden .......... 455/51

FOREIGN PATENT DOCUMENTS

0197556A2 9/1986 European Pat. Off. .......... 86/42
0082028 4/1988 Japan .......... 455/51

*Primary Examiner*—Reinhard J. Eisenzopf
*Assistant Examiner*—Timothy H. Keough
*Attorney, Agent, or Firm*—Philip P. Macnak; William E. Koch; Thomas G. Berry

[57] ABSTRACT

A method for measuring a time delay between a controller (302) and a plurality of base sites (306) in a simulcast system (300). The method begins with the controller (302) transmitting a synchronization signal to a selected base site (306A) and to a delay measurement device (316). Upon receipt of the synchronization signal by the selected base site (306A), the selected base site (306A) transmits a signal to the delay measurement device (316). The delay measurement device (316) determines the time between the receptions of the synchronization signal transmitted by the controller and the signal transmitted by selected base site (306A). The delay measurement device (316) transmits the delay time determined between the receptions of the synchronization signal transmitted by the controller and the signal transmitted by the selected base sites (306A) to the controller (302) which programs the base sites (306) to delay transmissions of the RF signals in response to the measured delay time.

16 Claims, 5 Drawing Sheets

METHOD AND APPARATUS FOR SYNCHRONIZING SIMULCAST SYSTEMS

FIELD OF THE INVENTION

This invention relates in general to simulcast communication systems, and more specifically to synchronization techniques for a simulcast communication system.

BACKGROUND OF THE INVENTION

As selective call network coverage areas grow to meet consumer demand in larger metropolitan areas, selective call network service providers must add additional transmitters to increase coverage area. However, interference between signals sent from the several transmitters cause difficulty in reception. This interference occurs in those areas where a selective call receiver can receive transmissions from two or more transmitters. As shown in FIG. 1, a conventional paging terminal (controller) 102 provides a signal to four transmitters 110A, 110B, 110C, and 110D. Each transmitter has an associated coverage area 106A, 106B, 106C, and 106D into which the signal from the controller is broadcast. Due to the difference in transmission path lengths and switching equipment, the transmission of the signal from one transmitter (110B for example) may be delayed with respect to the transmission of the signal from another transmitter (such as 110A). It is this delay that causes interference in overlapping coverage areas 108, because of the difference in arrival times of the signals from different transmitters.

To overcome the signal interference due to staggered transmitting times, some communication systems provide simultaneous transmission from the transmitters 110A-D. This process is commonly referred to as simulcast. Simulcast is a reliable method of achieving wide area coverage for one-way (paging) and certain other types of two-way communications. Obviously, simulcasting is not appropriate for all paging systems. However, for wide area coverage, simulcasting offers operational advantages not available in other conventional paging systems. For example, more selective call receivers (pagers) can be accommodated per channel, because obstruction losses due to buildings etc. are considerably reduced by multiple transmitter configurations.

One known simulcast system involves placing large coils(called equalization coils) in the transmission path from the terminal to each transmitter. By manually varying the amount of coil inserted in the transmission path the reception in the overlapping coverage area 108 can be improved. Regrettably, however, the equalized coils do not take into affect the variations in the length of the transmission path when a Public Switch Telephone Network PSTN is utilized. As is well known in the art, a PSTN service provider can route a call in any manner, at the providers option, as long as the call originates and ends at the required locations. Moreover, random intercall rerouting may also insert additional equipment into the transmission path further varying the time the signal arrives at the transmitter.

Another known simulcast solution, allows for presetting the delays at each transmitter and governing the transmission of the signals from the transmitters by accurate clocks, thereby simultaneously transmitting the signals. Regrettably, such a system is extremely costly due to the clocks.

In a conventional simulcast synchronization phase, the simulcast system transmits a known signal to measure delays between each base station and the controller to synchronize the simulcast transmissions. The selective call receivers within the system typically cannot recognize the synchronization signals. Unfortunately, the selective call receivers, during the synchronization phase will try to decode the random patterns in the synchronization sequence, which often results in "falsing". Falsing occurs when a selective call receiver incorrectly decodes an address of another device as its address. Also, the synchronization signal causes the system to spend a longer time in the synchronization phase, because the system has to re-format the signals differently in the paging mode than in the synchronization mode. This increase time translates in an unfavorable cost increase to the consumers of the paging system, because the longer synchronization time results in additional distributed charged to users.

Thus, what is needed is a simulcast system capable of synchronizing the transmission of signals from the transmitters while reducing the cost to the users and the potential of "falsing" during the synchronization phase.

SUMMARY OF THE INVENTION

A synchronization system for a simulcast system has a controller capable of transmitting a message signal to a plurality of base sites. The base sites thereafter being capable of retransmitting the message signal as an RF transmission at the same time. The synchronization system comprises a controller means for transmitting a first signal to a selected one of the plurality of the base sites and to a delay monitor. The base sites further includes a receiving means receiving the first signal, and a transmitting means transmitting a second signal to the delay monitor in response to the receipt of the first signal at the selected base site. The delay monitor includes means for receiving the first signal from the controller and the second signal transmitted from the selected base site subsequent to the receipt of the first signal by the selected one of the plurality of base sites. A measuring means, responsive to the receipt of first and second signals, measures a delay between the receipt of the first signal by the selected base site and the receipt of the first signal by the delay monitor. A means coupled to the delay monitor and the plurality of base sites programs each of the plurality of base sites for delaying the retransmission of the received message signal by the measured delay time associated with each of the plurality of base sites.

In a simulcast system having a controller capable of transmitting a message signal to a plurality of base sites, each base site thereafter being capable of retransmitting the message signal as an RF transmission at the same time, a method for synchronizing the message signal transmissions, comprising the steps of:

transmitting a first signal from the controller to a selected one of the plurality of base sites and to a delay monitor;

transmitting a second signal from the selected one of the plurality of base sites to the delay monitor in response to the reception of the first signal;

determining the delay time between the reception of the first signal by the selected one of the plurality of base sites and the reception of the first signal by the delay monitor wherein the reception of the second signal by said delay monitor determines the reception of the first signal by the selected one of the plurality of base sites; and programming the base site to delay retransmission of the RF transmissions in response to the transmission time.

DESCRIPTION OF A PREFERRED EMBODIMENT

Figure 1:
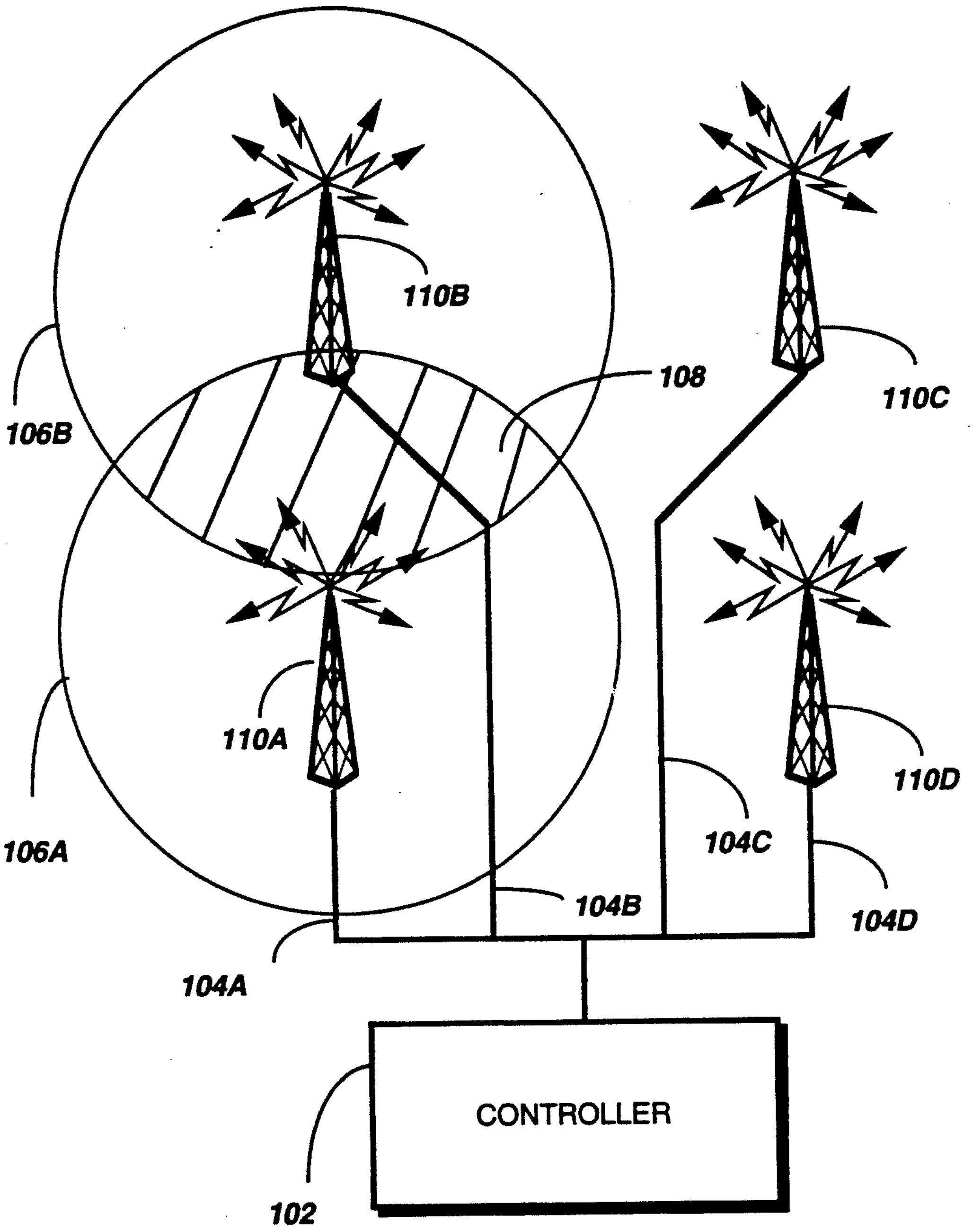
PRIOR ART FIG. 1
FIG. 1 is a block diagram of a conventional simulcast system.
Figure 2:
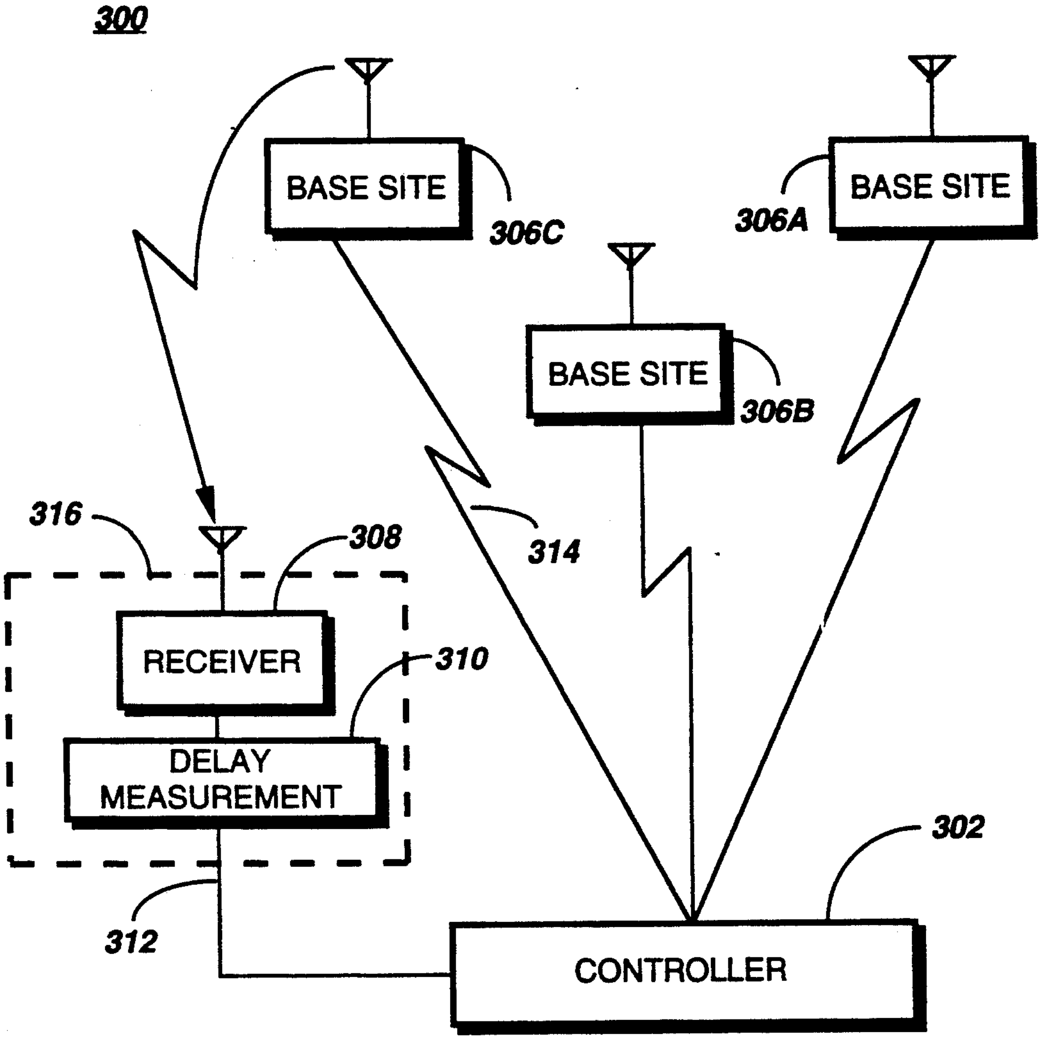
FIG. 2 is a block diagram of a simulcast system in accordance with the present invention.

According to the present invention, FIG. 2 shows a block diagram of a simulcast system 300 capable of measuring the delay between the controller 302 and a plurality of base sites 306 A–C. Operationally, the controller 302, prior to sending a prompt for a delay measurement sequence, notifies a delay monitor receiver 308 that a measurement is required. The notification may take the form of any of the several available techniques known to those skilled in the art. After the notification, the monitor receiver 308 enters a mode where it awaits the receipt of either a "time mark" from the controller 302 or a signal from a selected base site (306C for example). The controller 302 begins a timing phase by sending a "timing mark" to the delay receiver 308 and a message to the selected base site 306C. If the "time mark" sent along path 312 is received first, the delay monitor 316 starts an internal timer that continues until a retransmitted signal is received from the selected base site 306C. Alternately, if the signal from the selected base site 306C is received first by the delay monitor receiver 308, the delay monitor 316 similarly starts the timer, and upon the subsequent receipt of the "time mark", stops the timer.

The delay path 314, between the controller 302 and the base site 306C, may computed from the time measurement between the "time mark" and the signal from the selected base site 306C. It can be appreciated that the sequence of arrival of the "time mark" and the paging signal may be programmed to arrive in any particular sequence. However, it can be further appreciated that the invention functions equally well when either the "time mark" or the "paging type" timing signal arrive first except for a sign (positive or negative) difference. Those skilled in the art will further appreciate that the delay along the path 312 between the controller 302 and the monitor receiver 308 will remain fixed, and may be easily removed from the delay calculation.

Figure 3:
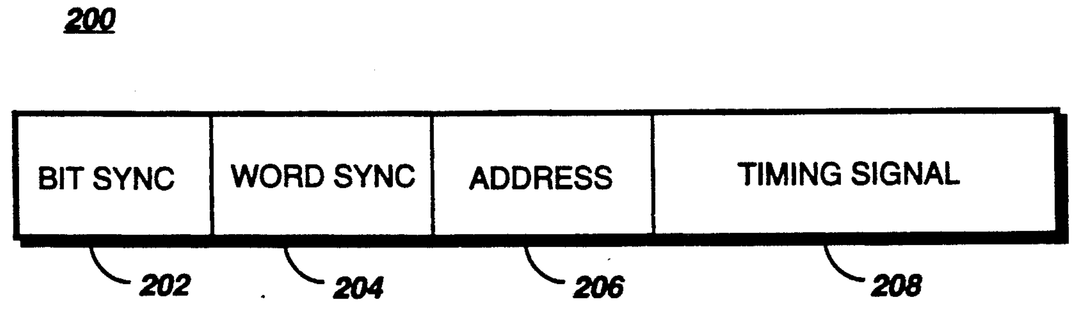
FIG. 3 is a block diagram of a signaling diagram of the synchronization phase in accordance with the present invention.

According to the invention, FIG. 3 shows a protocol signaling diagram 200 of a synchronization phase. The protocol signaling scheme 200 is similar to a typical selective call receiver signaling scheme during normal paging operations, except that the timing signal 208 occupies the position normally occupied by the message for the paged selective call receiver(s). Bit synchronization 202 and word synchronization 204 are similar to the paging protocol signaling phase of the system. Particularly, selective call receivers within the system will recognize that the address 206 is substantially different from its address. In this way, the information sent during the synchronization phase has a recognizable address that reduces the probability of "falsing", because the selective call receivers can easily determine that the message is addressed to another device. It can be appreciated that there is a higher probability of falsing when the selective call receivers receive a message that it is unable to recognize. Additionally, initiating the synchronization phase with a message or signal similar to the conventional paging scheme will permit quicker delay measurements because of fewer changes from conventional paging mode to synchronization phase.

Figure 4:
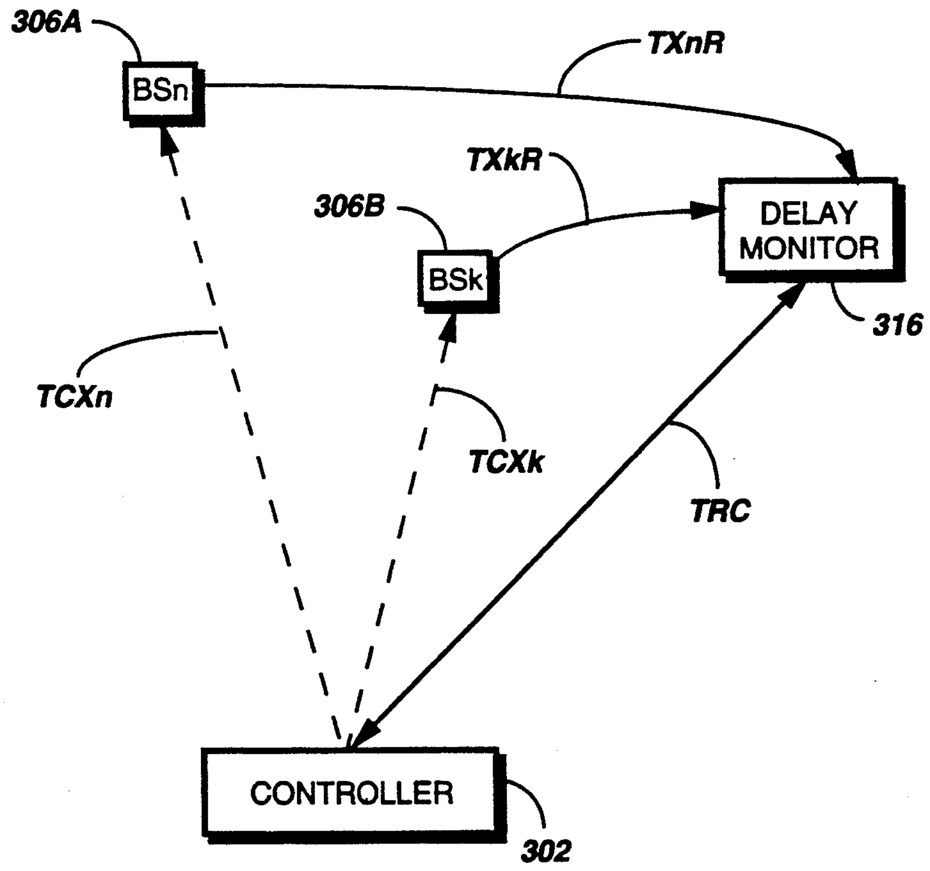
FIG. 4 is a signal flow diagram of the delay measurement in accordance with the present invention.

According to the invention, FIG. 4 shows the delay measurement paths from the controller 302 via two selected base site 306A, 306B and the delay monitor 316. When base site 306A is selected, the closed loop time measurements corresponds to:

$$T1CC = TCBS1 + TBS1R + TRC \quad (1)$$

where:

T1CC is the total elapsed time from the transmission and receipt of the signal by the controller 302;

TCBS1 is the delay between the controller 302 and the selected base site 306A;

TBS1R is the delay between the selected base site 306A and the delay monitor 316; and, TRC is the delay between the delay monitor 316 and the controller 302.

Selecting the next base site 306B, the closed loop time measurements are:

$$T2CC = TCBS2 + TBS2R + TRC \quad (2)$$

where:

the variables are similar to those shown above except that the chosen path includes a different base site 306B.

Substituting for TCBS1 in equation (1) gives:

$$TCBS1 = T1CC - TBS1R - TRC \quad (3)$$

and substituting for TCBS2 in equation 2 gives:

$$TCBS2 = T2CC - TBS2R - TRC \quad (4)$$

The delay is calculated by subtracting equation (4) from equation (3) that results in:

$$TCBS1 - TCBS2 = T1CC - T2CC - TBS1R + TBS2R$$

where:

(TCBS1-TCBS2) is the delay difference between base sites 306A and 306B,

T1CC and T2CC are the measured closed loop paths for base sites 306A and 306B respectively; and, TBS1R and TBS2R are known from simple measurements.

As shown, by simply replacing the message in the time signaling with timing sequence signals (shown in FIG. 3), the controller 302 can quickly initiate a synchronization phase to measure the delay difference between the controller and selected base sites. Using the same paging format having a unique address for the delay monitor reduces the chances of falsing, because the selective call receivers within the systems recognizes the page as a page simply addressed to another device.

Figure 5:
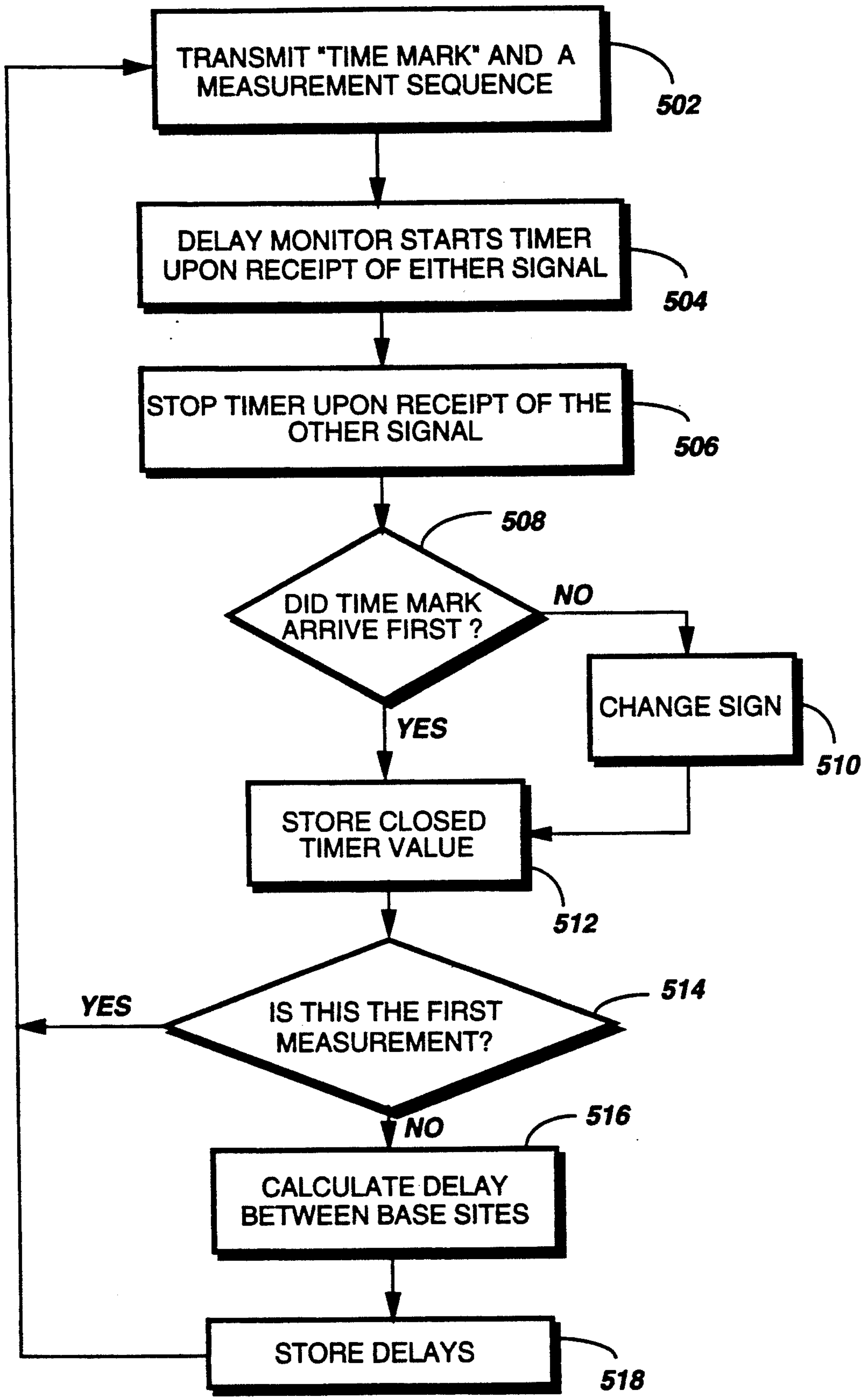
FIG. 5 is a flow chart of the synchronization phase in accordance to the present invention.

The operation of the simulcast system 300 (FIG. 2) is shown by the flow chart of FIG. 5. Initially, the controller 302 transmits a timing sequence and a "timing mark", step 502. Upon receipt of either the "time mark" or the timing sequence, a timer is started to measure the elapsed time, step 504. The timer is stopped when the other signal is received, step 506. The value of the timer is a measurement of the elapsed time of the closed loop of the selected base site (see FIG. 4). Preferably, the "time mark" arrives first, but depending on the closed loop path, the timing sequence may arrive first. Step 508 may check which signal arrives first. If the "time mark" arrive first, the elapsed time is stored, step 512. Alternately, if the timing sequence arrives first the sign bit is complemented, step 510, and subsequently stored, step 512. Step 514 determines if the current measurement is the first measurement taken, and if so, a next base site closed loop measurement is performed, step 502. Alternately, if a previous measurement was taken, the delay between two base sites is calculated, step 516. The calculated delays are stored, step 518, and used by the controller to synchronize the transmissions of the plurality of base sites.

Figure 6:
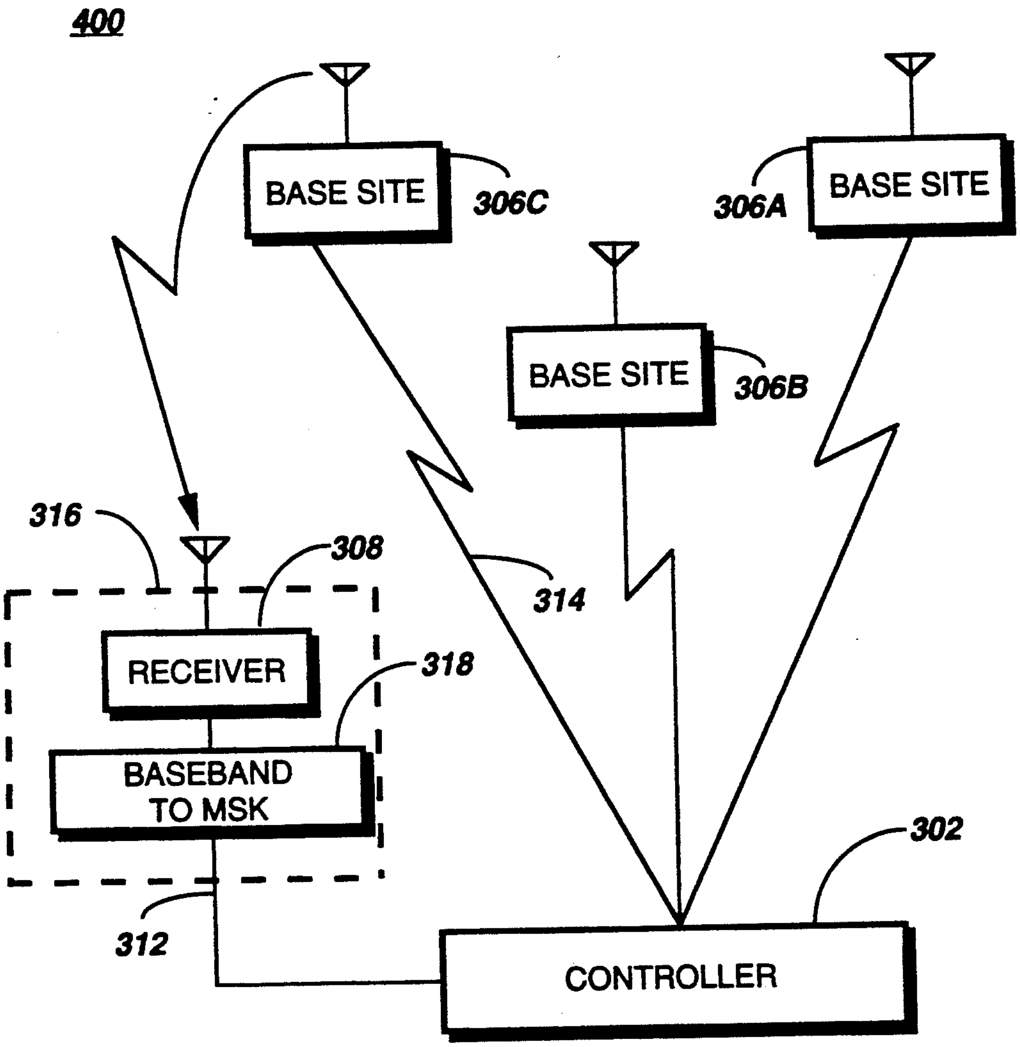
FIG. 6 is a block diagram of a simulcast system in accordance with a second embodiment of the invention.

FIG. 6 shows a second embodiment of the present invention. The operation of the second embodiment is similar to the first embodiment shown in FIG. 2 except for the following differences. The delay monitor 316 comprises a baseband to minimum-shift-keying (MSK) modulator 318. The delay monitor is preferably incorporated in a DSP processor, where tones are sent to the controller 302 to be decoded. Those skilled in the art will appreciate that MSK differs from FSK in that the two tones sent in MSK modulation are exactly one and one-half multiples of the transmission rate (i.e., 1200 Hertz and 1800 Hertz tones for a 1200 baud rate transmission). This characteristic guarantees that the bit transition occurs at the zero-crossing points. Zero-crossings assures minimum frequency discontinuities which affect the transmission, propagation characteristics, and the reception calculations.

In this way, the receiver 308 locks to the incoming baseband signal to determine the exact frequency to be used in encoding the signal. The received data will be encoded according to the amount of delay measured. However, this delay is uniform for all received signals, thus falling out by the difference calculation of any two of the plurality of base sites (discussed in FIG. 5). Furthermore, since a common controller 302 is used for multiple measurement sequences, the exact tones will not change significantly with different delay measurement on the plurality of base sites. FIGS. 3 through 5 can ably describe this second and subsequent embodiments of the present invention.

Accordingly, the based tenet of the invention, the delay measurement phase involves sending timing sequences incorporated with the same signaling format that would normally be used during a typical paging operation of a simulcast system. The selective call receivers within the simulcast system will quickly recognize the address of the delay monitor and determine that the page is addressed to another device (i.e., the delay monitor). In this way, the probability of "falsing" is reduced by sending recognizable signals. Additionally, the invention may be aptly applied to the available methods of measuring delays in a simulcast system, thus reducing the time spent to synchronize the system. Furthermore, this invention precludes using any extraneous frequencies that may violate the FCC or local regulations.

In summary, the invention provides a method for measuring the delays between a controller and a plurality of base sites in a simulcast system. The controller transmits a first signal to one of the base sites and transmits a second signal at substantially the same time to a delay monitor that receives the second signal and a third signal from the selected base site. The signal transmitted to the selected base site is substantially similar to the conventional paging signal except that it contains a timing sequence that replaces the conventional message. The delay monitor transmits the time between the transmission and reception of the first signal to the controller which programs the base site to delay transmissions of the RF signals in response to the measured delay. In this way, the invention can be aptly applied to the available methods of measuring delays in a simulcast system, thus reducing the time spent to synchronize the system.

Thus, what is claimed is:

1. A synchronization system for a simulcast system having a controller capable of transmitting a message signal to a plurality of base sites, the base sites thereafter being capable of retransmitting the message signal as an RF transmission at the same time, said synchronization system comprising:

controller means for transmitting a first signal to a selected one of the plurality of the base sites and to a delay monitor, the base sites further including:

receiving means for receiving the first signal; and transmitting means for transmitting a second signal to said delay monitor in response to receiving of the first signal at the selected base site;

said delay monitor including:

means for receiving the first signal from said controller and the second signal transmitted from the selected base site subsequent to the receipt of the first signal by the selected one of the plurality of base sites; and measuring means, responsive to receiving the first and second signals, for measuring a delay between the receipt of the first signal by said selected base site and the receipt of said first signal by said delay monitor; and means coupled to the delay monitor and the plurality of base sites for programming each of the plurality of base site for delaying the retransmission of the received message signal by the measured delay time associated with each of the plurality of base sites.

2. The simulcast system according to claim 1 wherein a delay sequence is formatted similar to the message signal being transmitted to the plurality of base sites.

3. The simulcast system according to claim 1 wherein a paging message is formatted similar to message signal.

4. The simulcast system according to claim 1 wherein the first and second signals are transmitted at the same frequency of the message signal.

5. The simulcast system according to claim 1 wherein the second signal is transmitted in a different modulation scheme than a modulation scheme of the first signal.

6. The simulcast system according to claim 1 wherein the second signal is transmitted with a similar modulation scheme as a modulation scheme of the first signal.

7. The simulcast system according to claim 1 wherein a delay time is measured for a closed-looped path determined by the reception of the first and second signals at the delay monitor.

8. The delay time measurement according to claim 7 wherein the delay time measurement begins with the reception of the first signal and ends with the reception of the second signal by said delay monitor.

9. The delay time measurement according to claim 8 wherein the delay time measurement begins with the reception of the second signal and ends with the reception of the first signal by said delay monitor.

10. In a simulcast system having a controller capable of transmitting a message signal to a plurality of base sites, each base site thereafter being capable of retransmitting the message signal as an RF transmission at the same time, a method for synchronizing the message signal transmissions, comprising the steps of:

transmitting a first signal from the controller to a selected one of the plurality of base sites and to a delay monitor;

transmitting a second signal from the selected one of the plurality of base sites to the delay monitor in response to the reception of the first signal;

determining the delay time between the reception of the first signal by the selected one of the plurality of base sites and the reception of the first signal by the delay monitor wherein the reception of the second signal by said delay monitor determines the reception of the first signal by the selected one of the plurality of base sites; and programming the base site to delay retransmission of the RF transmissions in response to the transmission time.

11. The method according to claim 10 wherein the step of transmitting the second signal transmits said second signal at the same frequency as the first signal.

12. The method according to claim 10 wherein the step of transmitting the second signal transmits said second signal with a different modulation scheme than a modulation scheme of the first signal.

13. The method according to claim 10 wherein the step of transmitting the second signal transmits said second signal with a similar modulation scheme as a modulation scheme of the first signal.

14. The method according to claim 10 wherein the step of determining the delay time includes the step of measuring said delay time for a closed-looped path determined by the receipt of the first and second signals by the delay monitor.

15. The method according to claim 14 wherein the step of measuring the delay time begins measurements with the receipt of the first signal and ends with the receipt of the second signal.

16. The method according to claim 14 wherein the step of measuring the delay time begins measurements with the receipt of the second signal and ends with the receipt of the first signal.

* * * * *